United States Patent [19]
Jones

[11] 4,066,432
[45] Jan. 3, 1978

[54] PRODUCTION OF SUSPENSION FERTILIZERS FROM WET-PROCESS ORTHOPHOSPHORIC ACIDS

[75] Inventor: Thomas M. Jones, Sheffield, Ala.

[73] Assignee: Tennessee Valley Authority, Muscle Shoals, Ala.

[21] Appl. No.: 763,423

[22] Filed: Jan. 28, 1977

Related U.S. Application Data

[63] Continuation-in-part of Ser. No. 702,209, July 2, 1976, now Defensive Publication No. T959,001.

[51] Int. Cl.² .............................................. C05B 7/00
[52] U.S. Cl. ................................... 71/34; 71/43; 71/64 C; 423/313
[58] Field of Search ............... 71/34, 37, 43, 64 C; 423/305, 313, 314, 315, 317

[56] References Cited
U.S. PATENT DOCUMENTS

| | | | |
|---|---|---|---|
| Re. 29,149 | 3/1977 | Young | 71/43 X |
| T889,024 | 8/1971 | Jones | 71/34 |
| T900,026 | 7/1972 | Jones | 71/34 |
| 3,813,233 | 5/1974 | Kendrick, Jr. | 71/34 |
| 3,938,982 | 2/1976 | Frangioni et al. | 71/34 |

*Primary Examiner*—Charles N. Hart
*Assistant Examiner*—Ferris H. Lander
*Attorney, Agent, or Firm*—Robert A. Petrusek

[57] ABSTRACT

A process for preparing concentrated, high-grade, nitrogen-phosphate (N—P₂O₅) base suspension fertilizer from wet-process or other impure orthophosphoric acids. The process involves a new procedure for the direct ammoniation of orthophosphoric acid in stages for production of fluid, high-analysis, N—P₂O₅ suspension fertilizer with good physical properties. The new process contains a novel method for prevention of settling of crystals in the suspension during vibration, such as that which occurs during shipment. Settling is avoided by producing small, thin crystals of diammonium phosphate through control of the N:P₂O₅ ratio and temperature in the second and third ammoniation stages.

6 Claims, 3 Drawing Figures

PRODUCTION OF AMMONIUM PHOSPHATE SUSPENSION FERTILIZERS BY
A TWO-STAGE CONTINUOUS AMMONIATION PROCESS

EFFECT OF N:P₂O₅ RATIO ON SETTING OF CRYSTALS IN SUSPENSIONS PREPARED BY THE TWO-STAGE PROCESS DURING THE VIBRATION TEST

EFFECT OF N:P$_2$O$_5$ RATIO ON THICKNESS OF DIAMMONIUM PHOSPHATE IN ORTHOPHOSPHATE BASE SUSPENSION MADE FROM WET-PROCESS ACID

PRODUCTION OF SUSPENSION FERTILIZERS FROM WET-PROCESS ORTHOPHOSPHORIC ACIDS

The invention herein described may be manufactured and used by or for the Government for governmental purposes without the payment to me of any royalty therefor.

This application is a continuation-in-part of copending application Ser. No. 702,209, filed July 2, 1976, for PRODUCTION OF SUSPENSION FERTILIZERS FROM WET-PROCESS ORTHOPHOSPHORIC ACIDS, now U.S. Def. Pub. No. T959,001, published June 7, 1977.

My invention relates to improvements in the process for producing high-analysis nitrogen-phosphate (N—$P_2O_5$) suspension fertilizers from orthophosphoric acids (see U.S. Pat. No. 3,813,233, L. A. Kendrick, Jr.) and in the product therefrom. More particularly, it relates to the production of N—$P_2O_5$, orthophosphate suspension fertilizers that have small crystals, good shipping properties, high grade, low viscosity, and satisfactory long-term storage characteristics. Still more particularly, my invention relates to a novel method of producing orthophosphate suspension fertilizer by reaction of ammonia with impure wet-process or other orthophosphoric acids to form concentrated N—$P_2O_5$ suspension fertilizer products with crystals that do not settle when subjected to vibration such as that which occurs during shipment.

The art of producing fluid fertilizers, both liquids and suspensions, is well known and fully described in the literature. See, for examples, the following U.S. Pat. No. 2,950,961, Striplin et al, Aug. 30, 1960; U.S. Pat. No. 3,015,552, Striplin et al, Jan. 2, 1962; U.S. Pat. No. 3,109,729, Slack et al, Nov. 5, 1963; U.S. Pat. No. 3,113,858, Slack et al, Dec. 10, 1963; U.S. Pat. No. 3,326,666, Walters, June 20, 1967; U.S. Pat. No. 3,096,170, Newsome, July 2, 1963; U.S. Pat. No. 3,234,004, Smith et al, Feb. 8, 1966; U.S. Pat. No. 3,148,970, Smith et al, Sept. 15, 1964; U.S. Pat. No. 3,697,247, Jones et al, Oct. 10, 1972; U.S. Pat. No. 3,382,059, Getsinger, May 7, 1968; U.S. Pat. No. 3,192,013, Young, June 29, 1965; and U.S. Pat. No. 3,813,233, Kendrick, May 28, 1974; also U.S. Def. Pub. No. T889,024, Jones and Frazier, Aug. 31, 1971; and U.S. Def. Pub. No. T900,026, Jones, July 25, 1972.

The most common method of producing both solution and suspension fertilizers containing nitrogen and phosphate is by ammoniation of phosphoric acids. In the early 1950's, electric furnace orthophosphoric acid, which is relatively free of impurities, was ammoniated to form 8-24-0 grade liquid fertilizer. Subsequently, it was demonstrated that superphosphoric acid could be produced and used in preparing solutions of higher grades such as 10-34-0 and 11-37-0. Later suspension fertilizers which contain crystals of fertilizer salts suspended in saturated solutions were developed, and higher grades of fluid fertilizers than were available in the prior art were prepared commercially. Nitrogen compounds, such as urea, ammonium nitrate, ammonium sulfate, or urea-ammonium nitrate solution, and potassium compounds, such as potassium chloride, sulfate, etc., were added to the ammoniated phosphoric acid solutions and suspensions to give mixed fluid fertilizers with various ratios and grades.

Fluid fertilizers being produced at the present time that have both high analyses and satisfactory long-term shipping and storage properties contain polyphosphates. These fertilizers, which are almost as high in grade as solid products, are made from superphosphoric acid which contains substantial amounts of pyro and more condensed species of polyphosphates, e.g., tripoly, or from wet-process orthophosphoric acid with superphosphoric acid added to sequester the congeneric impurities. These suspension fertilizers display certain distinct advantages over dry mixes in that costs of handling and storage are less, and distribution of the fertilizers or fertilizers containing pesticides is simplified with more even distribution to the soil being obtained. However, raw material costs for fluid fertilizers containing polyphosphate have been relatively high, and fluids containing polyphosphates, in many instances, therefore have had difficulty competing, strictly on an economical basis, with solid fertilizers. Since wet-process merchant-grade phosphoric acid costs less per unit of $P_2O_5$ than superphosphoric acids, which contain polyphosphates that sequester impurities, or electric furnace orthophosphoric acids, which contain little or no impurities, the use of merchant-grade acid in preparation of liquid and suspension fertilizers has often been attempted. However, the grades of the fluid fertilizers were lower because of numerous factors, including impurities which precipitate as amorphous compounds with gel-like characteristics when such acids were ammoniated. The gelatinous properties of the precipitated impurities often completely destroyed the fluidity of the high-grade products and made it necessary to dilute them with water to low grade at the time of production to prevent excessive thickening or gelation in pumps, pipelines, and storage tanks. Once the materials in the pumps, pipelines, valves, tanks, etc., attain semisolid condition, it is extremely difficult to restore the fluidity.

Of the various methods and means available to the industry for manufacturing liquid fertilizer solutions and/or suspensions from wet-process phosphoric acid and in consideration of all of the factors involved, such as costs of manufacturing, transportation, application to the soil, and characteristics of the fertilizers to store well, three routes from phosphate rock to such fluid fertilizers probably are the most economical of the many known processes.

One of the routes 1 is the use of the direct process (as in Getsinger U.S. Pat. No. 3,382,059 supra) using the heat of ammoniation to convert merchantgrade wet-process orthophosphoric acid to an ammonium polyphosphate melt or possibly solution or suspension in preference to using the indirect process (as in Young U.S. Pat. No. 3,192,013, supra) of separately concentrating the acid by application of heat, then to be followed by the later ammoniation thereof.

Another major route 2 (as in Striplin et al., U.S. Pat. No. 3,015,552, supra) followed at the present time is to start with merchant-grade wet-process phosphoric acid (about 54 percent $P_2O_5$) and ammoniate it under conditions referred to by both Young and Getsinger as prior art. Such ammoniation without polyphosphate yields a thick pasty semisolid normally characterized by properties which are undesirable and make it unwieldy to handle; or alternatively, a dilute, low-grade fluid is made. Since the ammoniated product becomes more viscous and more unwieldy with storage time and temperature, the problem is more serious because the gel-like product acts as a solid in valves, pipes, storage tanks, etc. Drastic measures may be required for removal of the solid products because dilution with water is more difficult once the product has developed to the solid state. However, from the freshly ammoniated acid, a clear liquid grade (10-34-0) or a suspension grade (13-39-0, 1.5% clay) that will store satisfactorily for 90 days or longer at 100° F may be prepared by adding an ammoniated superphosphoric acid material such as 12-40-0 or 11-37-0 in amounts to supply about 40 percent of the total phosphate as polyphosphate and then diluting with water to the proper grade. However, polyphosphate is a necessary and an essential ingredient of the high-grade fertilizer products. It is further noted that by either procedure, addition of polyphosphate adds to the cost of the fertilizer.

The other major route 3 is the direct two-stage ammoniation process (as in Kendrick U.S. Pat. No. 3,813,233) for production of orthophosphate suspension by ammoniation of wet-process orthophosphoric acid in such a manner as to form concentrated $N$-$P_2O_5$ suspensions without formation of the usually occurring amorphous or gelatinous precipitates which cause high viscosity and nonpourability.

Orthophosphate suspension fertilizer, made by this route, is fully described in U.S. Pat. No. 3,813,233 by Kendrick. The suspension is a high-analysis fluid with low viscosity (free from metallic impurity gels) and has excellent long-term storage properties under static conditions. However, it is not known that when these products are subjected to vibration, such as that which occurs during shipment, especially in railroad tank cars, crystals settle and pack together on the bottom of the shipping container. Usually only the fluid portion above the settled crystals can be transferred to storage tanks because the settled crystals cannot be loosened sufficiently or broken up by prodding, air sparging, or other means normally at the disposal of either fertilizer dealers or consumers. The crystals that settle during transportion of the high-analysis products that are made by the two-stage process, which are principally monoammonium phosphate ($NH_4H_2PO_4$) and diammonium phosphate [$(NH_4)_2HPO_4$], are usually returned in the railroad cars or other shipping container to the manufacturer for removal and either discarded or reprocessed into usable materials. These settled crystals constitute a high proportion (up to 20%) of the total plant nutrient (N + $P_2O_5$) being shipped, and not only causes the intolerable difficulties in unloading and reprocessing, but also increases greatly the costs of production, handling and shipping, all of which make the process less competitive with other fertilizer production processes and, in general, unattractive. For example, during the first nine months of 1975, 283 railroad tank car loads (14,185 tons) of medium grade (about 13-36-0, 1.5 percent clay) orthophosphate suspension fertilizer was made by the two-stage process and shipped to various locations in the United States. Approximately 7 percent of the total plant nutrient being shipped was crystals that settled and packed on the bottom of the railroad tank cars and was returned for refund. My present invention for the production of high-analysis suspension fertilizers, from low-cost wet-process or other impure phosphoric aicds, with crystals that do not settle during transit and which have excellent shipping properties, adds to, opens up, and makes workable this less expensive route for producing high-quality suspension fertilizers.

It is therefore the principal object of the present invention to produce by a simple economical procedure, concentrated, fluid $N$—$P_2O_5$ orthophosphate suspension fertilizer with both good shipping and good storage properties. A further object is to produce from low-cost materials, concentrated, fluid $N$—$P_2O_5$ orthophosphate suspension fertilizer with crystals that will not settle and pack on the bottom of the railroad tank car or other shipping container during vibration such as that which occurs during transit.

A still further object is to produce fluid, high-analysis suspensions with both good shipping and good storage properties without sacrifice in quality, grade, or versatility.

Still further and more general objects and advantages of the present invention will appear from the more detailed description that I have set forth in the following descriptions and examples.

I have found that when wet-process or other orthophosphoric acids are reacted with ammonia by the process that I have discovered, a fluid, high-analysis product with crystals of a type that will not settle during transit results. There is no sacrifice in product grade, quality, versatility, storage properties, or other physical or chemical characteristics and there is very little added production cost.

The theory behind my invention is that high-analysis suspension fertilizers must be manufactured with an abundance of small (thin) equilibrium-type crystals which are near in density to that of the solution phase, otherwise they will settle during vibration such as that which occurs during transit by rail. Furthermore, due to the abundance of thin crystals, none will grow large or thick during storage and cooling. In orthophosphate suspension fertilizers, the solid portion may consist of the metallic impurities together with either monoammonium phosphate crystals alone, both mono- and diammonium phosphate crystals, or only diammonium phosphate crystals, depending upon the N:$P_2O_5$ ratio of the suspension fertilizer. In products made by the two-stage process, the metallic impurity crystals do not settle, form gel-like materials, or otherwise cause trouble; but both the monoammonium and diammonium phosphate crystals settle during vibration such as occurs during shipping. The monoammonium phosphate crystals are rod-like in shape (for example, 100 × 100 × 600 microns). The diammonium phosphate crystals are plate-like in shape (for example, 50 × 600 × 600 microns) and are less dense than monoammonium phosphate crystals. The higher density together with the rod-like shape of the monoammonium phosphate crystals cause them to settle readily during vibration, so their presence is undesirable in suspension fertilizers. However, when orthophosphoric acid is ammoniated in either a single step or by the two-stage process to an N:$P_2O_5$ ratio which excludes most or all of the monoammonium phosphate from the suspension fertilizer, the diammonium phosphate crystals invariably become thick. The thick crystals settle during vibration almost as readily as monoammonium phosphate crystals, and heretofore, no method was known for production of high-analysis orthophosphate suspension fertilizer from wet-process or other orthophosphoric acids that would not settle during vibration such as occurs during shipment. I have now discovered a method for producing suspensions in which unexpectedly crystals will not settle during shipment. I have found that when ammonia is added to a slurry containing crystalline monoammonium phosphate, the product from the reaction is small (thin) diammonium phosphate crystals. The slurry can then be processed into suspensions by the addition of gelling clay, and the crystals do not settle and pack on the bottom of the container when the gel is broken by vibration such as occurs during shipment by rail.

The new process consists of ammoniating wet-process or other orthophosphoric acids in a first-stage boiling reactor to pH (sample diluted 1:4H$_2$O) in the range of about 3.5 to 5.0 (N:P$_2$O$_5$ ratio about 0.20 to 0.23), as described by Kendrick (U.S. Pat. No. 3,813,233), for prevention of formation of gel-like metallic impurity compounds. In a second stage, the partially ammoniated acid is cooled to the range of 160° to 220° F and further ammoniated for increasing the N:P$_2$O$_5$ ratio from about 0.20–0.23 up to about a maximum of about 0.34. The material from this stage is cooled to about 120° F or lower for production of a slurry containing only monoammonium phosphate crystals (N:P$_2$O$_5$ ratio up to about 0.28 and depending upon the temperature) or both mono- and small diammonium phosphate (N:P$_2$O$_5$ ratio up to about 0.34 also dependent on temperature). At this point, if this material is processed into a suspension fertilizer by adding an attapulgite clay, the crystals, principally monoammonium phosphate will settle and pack during vibration. However, if further ammonia is added rapidly in a third stage, such as the cooler, clay mixer, or other separate vessels for conversion of monoammonium phosphate crystals to diammonium phosphate crystals (N:P$_2$O$_5$ ratio 0.35 to about 0.37) without increasing the temperature in excess of about 110° F, only small (thin) crystals of diammonium phosphate are found present in the product. These crystals do not settle and pack on the bottom of the container during vibration such as occurs during transit in railroad tank cars. Furthermore, an added benefit, freedom from pollution as ammonia losses and entrained particles during the manufacturing steps, is obtained.

My invention, together with further objects and advantages thereof will be better understood from consideration of the following drawings, descriptions, and illustrative examples.

Figure 1:
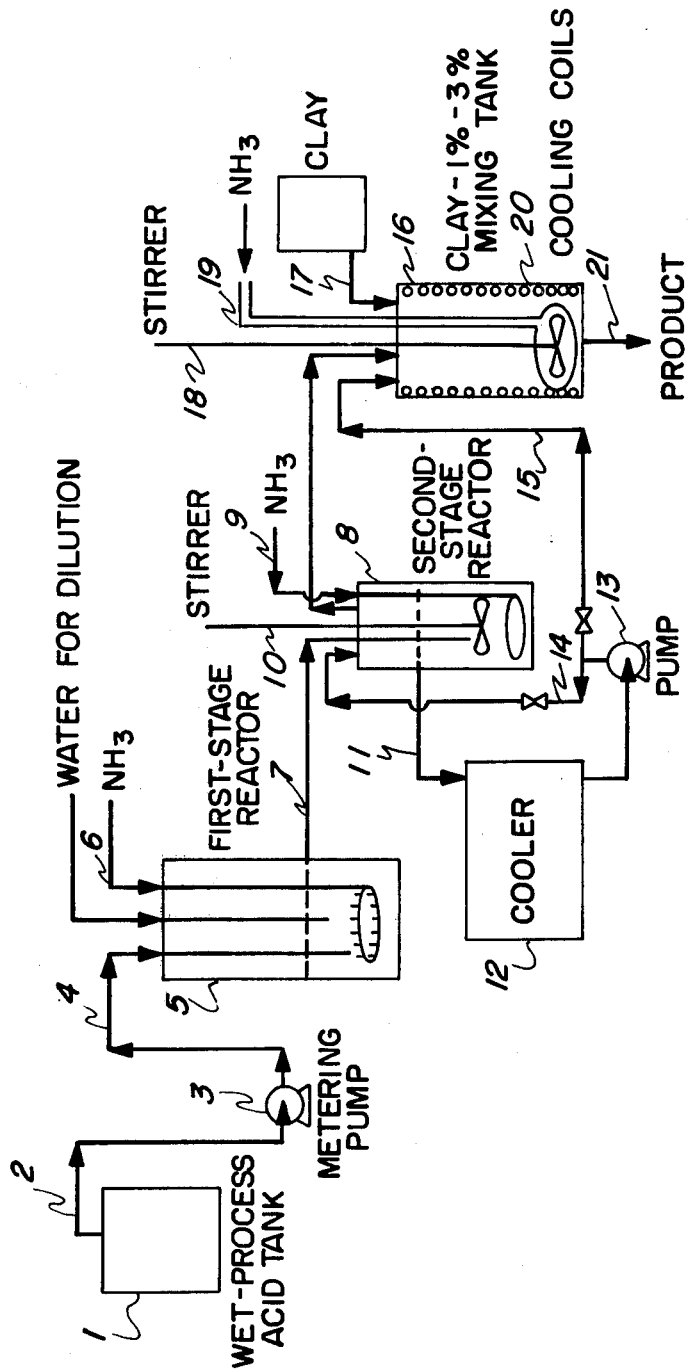
FIG. 1 is a flowsheet generally illustrating the principles of my novel process.

Referring now more specifically to FIG. 1, substantially all of the wet-process orthophosphoric acid employed is fed from tank 1 through pipeline 2 to metering pump 3 and on through line 4 to first-stage reactor 5 through pipeline 6. Water for dilution also from a source not shown is introduced into first-stage reactor 5 as indicated. The ammonia is distributed at the bottom of first-stage reactor 5 through a sparger illustrated as located just below the wet-process orthophosphoric acid outlet. Ammonia-wet-process acid product from first-state reactor 5 overflows through pipeline 7 into second-stage reactor 8. Ammonia gas is fed through pipeline 9 to second-stage reactor 8 and distributed through a sparger located at the bottom just below stirrer 10. Product from second-stage reactor 8 overflows through pipeline 11 to cooler 12. A portion of the cooled product is recirculated by pump 13 to second-stage reactor 8 through pipeline 14. Another portion is fed through pipeline 15 to clay mixing tank 16. Clay is fed from a source not shown through conveyor 17 to mixing tank 16 simultaneously with ammonia through line 19 to mixing tank 16 and distributed through a sparger located at the bottom just below stirrer 18 which is used for dispersion of the clay in the slurry. (The third ammoniation step could also be carried out equally well in the cooler or a separate vessel.) The resulting orthophosphate suspension product is discharged to storage through pipeline 21.

In carrying out the objects of my invention, I have found that high-grade ammonium orthophosphate suspension fertilizer with both excellent storage and shipping properties can be prepared by ammoniation of wet-process orthophosphoric acid. The feed acid can be merchant grade (54 percent P$_2$O$_5$) or range in concentration down to filter grade (30 percent P$_2$O$_5$). I have found further that three ammoniation stages or steps are required for producing ammonium orthophosphate suspensions that are fluid, free from gel-like metallic compounds, and in which crystals will not settle and pack on the bottom of the containers during vibration such as occurs during transit. I have still further found that for my process to be most effective, the wet-process acid and gaseous ammonia should be fed to the first stage of the process in proportions for maintaining a pH (measured by diluting a sample of 1 part with 4 parts of water) that is in the range of 3.0 and 5.5 (N:P$_2$O$_5$ weight ratio about 0.20–0.25) with pH 5.0 (N:P$_2$O$_5$ weight ratio, 0.23) being preferred. With this degree of ammoniation in the first stage, the product suspension fertilizers are free from metallic gels (Kendrick - FIG. 2) and a large part of the heat which is generated by the ammonia-acid reaction can be dissipated economically by evaporation of water (Kendrick - FIG. 2—my lowest pH 3.0 v. his 2.0). Operation of the first stage at boiling temperature is also preferred due to the higher solubility of monoammonium phosphate at boiling compared with lower temperatures. At lower temperatures, crystals of monoammonium phosphate form and adhere to the walls of the reactor and pipelines; during production, the pipe leading to the second stage will stop up. The retention time in the first stage may be varied over a wide range of 15 to 75 minutes; however, 30 minutes is preferred. In the second stage, satisfactory suspensions can be prepared with the N:P$_2$O$_5$ weight ratio within the range of 0.27 to 0.34 (pH of samples diluted 1:4 H$_2$O of 5.7 to 6.6); however, an N:P$_2$O$_5$ ratio of about 0.32 is preferred. Retention time in the second stage may be set for convenience; 10 to 20 minutes was usually used. Temperature of the second stage should be within the range of 180° F to boiling (about 225° F) for prevention of nucleation or growth of ammonium phosphate crystals in this stage; 200° F is preferred. If the second-stage reactor contains suspersaturated solution, crystals recycled from the cooler will grow to large size and the monoammonium phosphate and large, thick diammonium phosphate crystals will settle during transit of the suspension fertilizers. The temperature of the cooler should be within the range of 70° to 120° F with about 100° F being preferred so that quenching the solution from well above saturation temperature (200° F) to well below (100° F) will cause nucleation of an abundance of small ammonium phosphate crystals, and none will grow to large size. With temperatures of about 120° F, or above, in the cooler, the diammonium phosphate crystals will grow while cooling slowly and settle during vibration such as occurs during transit. With the first- and second-stage reactors and the cooler operated as described above, losses of water by evaporation will permit use of a dilute (30 to 37 percent $P_2O_5$) wet-process acid in production of a high grade product. From the cooler, slurry is pumped to the clay mixer which is held at temperatures of about 90° to 120° F by means of cooling coils; the preferred temperature range being 100° to 110° F. In the mixing tank, attapulgite clay (1 to 3 percent, 1.5 percent being preferred) is added as the gelling agent and is mixed in the slurry with a turbine-type stirrer operated at about 28 feet per second, tip speed. Ammonia for increasing the $N:P_2O_5$ ratio to within the range of 0.34 to 0.37 is also added in the clay mixer; the preferred range is 0.35 to 0.36. The ammonia reacts with the monoammonium phosphate crystals from the cooler and converts them to diammonium phosphate without significantly increasing the size of the diammonium phosphate crystals already present in the suspensions. With temperatures in the clay mixer higher than about 120° F, the diammonium phosphate crystals grow larger, and they will settle during transit. Also, with $N:P_2O_5$ ratios lower than about 0.34 monoammonium phosphate crystals will be present and they will settle during transit. With ratios higher than 0.37, the diammonium phosphate crystals will be larger and the solution phase of the suspension will be of lower density and the crystals will settle during transit.

In order that those skilled in the art of fluid fertilizer production may better understand how the present invention may be practical for production of high-grade suspension with vastly improved dynamic storage properties, the following examples are given by way of illustration and not necessarily by way of limitation.

EXAMPLE I

Figure 2:
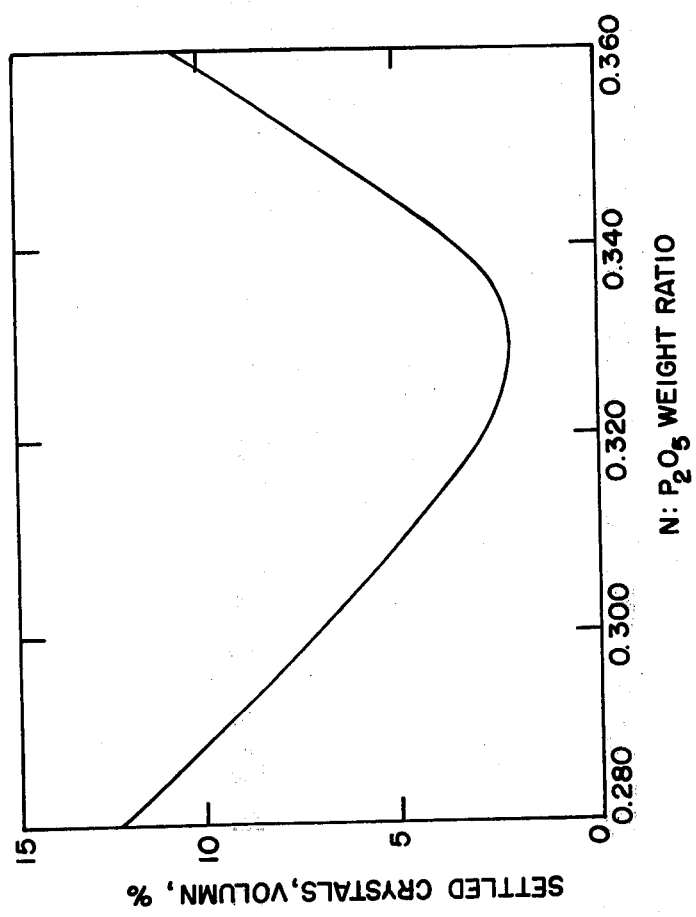
FIG. 2 is a graphical illustration of the effect of N:P$_2$O$_5$ ratio in the second stage of the two-stage process on settling of crystals during vibration such as occurs during transit. This effect is fully described in Example I infra.

The example (FIG. 2) shows settling of crystals, in suspensions prepared from wet-process acid by the two-stage process, during vibration such as occurs during transit in railroad tank cars. The suspensions were prepared by the two-stage process operated under the most favorable conditions as taught by Kendrick (U.S. Pat. No. 3,813,233). This two-stage process is for prevention of formation of metallic phosphate gel-like compounds which increase viscosity, decrease fluidity, and make necessary large decrease in product grade for obtaining suspension fertilizers with satisfactory flow properties both initially and after static storage under various conditions of temperature and time. The suspensions prepared by this two-state procedure had good flow properties but ammonium orthophosphate crystals settled and packed on the bottom of the containers during vibration which simulated that which occurs in railroad tank cars during transit. Other crystals in the suspensions, those composing the metallic impurities from the wet-process acid, did not settle. The vibration equipment used for testing the products was improvised by modifying an electro-magnetic sieve shaker. A metal pan (7 in by 12 in) was bolted to the metal plate on top of the vibrator. A sheet of Teflon, ⅛-inch thick, covered the bottom of the pan to prevent breakage of the glass bottles used to hold the suspension fertilizer samples. A wooden divider with eight compartments was fitted snugly in the pan on top of the Teflon sheet. Each compartment was capable of holding an 8-ounce glass bottle three-fourths full of suspension. The intensity of vibration was arbitrarily set and left at a constant level, and the amount of crystals that settled during 3 hours was measured. The data obtained from the tests, shown in FIG. 2, relate to the effect of $N:P_2O_5$ weight ratio of the suspension fertilizer products made by Kendrick's two-stage ammoniation process on settling of the ammonium phosphate crystals during vibration. The curve shows the actual average percent by volume of crystals that settled during the vibration test from suspension fertilizers with various $N:P_2O_5$ ratios. With low ratio (about 0.28), the product suspensions contained high proportions (about 11.5 volume percent) of settled crystals after vibration; microscopic analyses indicated that most of the crystals in the suspension were monoammonium phosphate. With increase in $N:P_2O_5$ ratio from about 0.28 to about 0.33, the average proportion of settled crystals, after vibration, decreased to about 2 percent; microscopic analysis indicated that the suspensions contained major phases of both mono- and diammonium phosphate crystals. With further increase in $N:P_2O_5$ ratio, the proportion of settled crystals, after vibration, increased and at high $N:P_2O_5$ ratio (about 0.36) occupied about 11 percent of the total volume. Products with $N:P_2O_5$ ratio of about 0.34 or greater were heavily loaded with diammonium phosphate crystals and most of the crystals that settled at the higher ratios were thick (>50 microns) diammonium phosphate crystals, verified by microscopic examination. These data plotted in FIG. 2 show that the trend in proportion of settled crystals after vibration was to increase with increase in quantities of both monoammonium phosphate crystals (low $N:P_2O_5$ ratio) and large (thick) diammonium phosphate crystals (high $N:P_2O_5$ ratio). However, settling of crystals in the suspension products during vibration was not completely eliminated by any adjustment of the $N:P_2O_5$ ratio in either stage of the two-stage process.

EXAMPLE II

Figure 3:
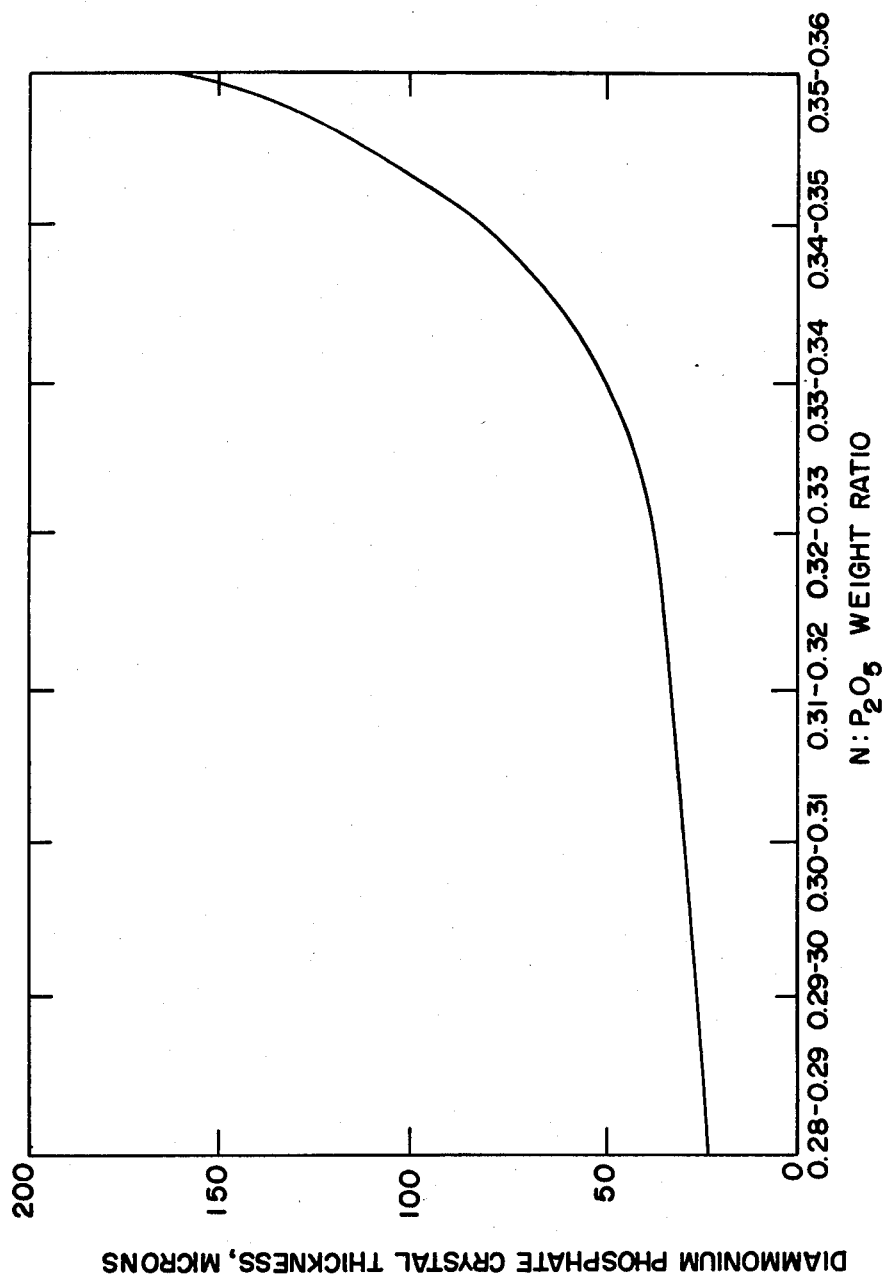
FIG. 3 is a graphical illustration of the effect of pH in the second stage of the two-stage process on thickness of the diammonium phosphate crystals in the product. This effect is fully described in Example II infra.

This example shows how the thickness of the diammonium phosphate crystals vary with the $N:P_2O_5$ ratio of product suspension fertilizers prepared by the two-stage process as taught by Kendrick (U.S. Pat. No. 3,813,233). The averaged data plotted in FIG. 3 were obtained from suspensions that were prepared with the two-stage equipment operated under conditions shown in Kendrick's patent to be most favorable for production of suspensions with good flow properties, both before and after static storage at various temperatures and lengths of time. The results shown in FIG. 3 indicate that the thickness of the diammonium phosphate crystals increased rapidly with increase in $N:P_2O_5$ ratio above 0.34. Since production of suspensions with thin diammonium phosphate crystals is essential for reducing of eliminating settling of crystals during vibration, the data indicate that the $N:P_2O_5$ ratio of the product suspension fertilizers must not exceed about 0.34. However, $N—P_2O_5$ suspension fertilizers with ratios less than about 0.34 contain, under normal conditions, rod-like monoammonium phosphate crystals which have higher density than the plate-like diammonium phosphate crystals, and they settle even more readily during vibration than the diammonium phosphate crystals. The data supra (examples I and II) further indicate that suspensions prepared by the two-stage process will contain monoammonium phosphate or thick diammonium phosphate crystals both of which settle during vibration in suspensions containing attapulgite clay as the suspending agent. Therefore, it would be difficult, impractical, and probably impossible to produce a satisfactory ammonium phosphate suspension fertilizer as described in U.S. Pat. No. 3,813,233 with crystals that will not settle during transit by rail.

EXAMPLE III

This example shows how ammonium phosphate suspension fertilizers that will not settle during vibration, such as that which occurs during transit in railroad tank cars, can be prepared by my new, improved and unique process from wet-process orthophosphoric acid. The data shown in Table I, infra, were obtained from suspensions that were prepared with the equipment shown in FIG. 1 operated under the conditions previously described as necessary for production of satisfactory suspensions.

To show the effect of adding ammonia in the clay mixer, the slurry from the cooler was divided into two parts. To the first part, only clay was added in the clay mixer. To the second part both clay and ammonia were added. Results obtained from the tests are shown in Table I below. The results indicate that concentrated product (37 to 39 percent phosphate) with N:P$_2$O$_5$ ratios in the range of about 0.27 to 0.34 (no ammonia added in the clay mixer) had initial viscosities that were in the satisfactory range of < 1000 centipoises at 80° F, indicating that they were essentially free of metallic gel-like compounds. However, the crystals settled during vibration tests (described above) which simulated that which occurs during transit, and due to the settling, the products were unsatisfactory. With ammonia gas added to these same suspensions in the clay mixer to increase their N:P$_2$O$_5$ ratio from the range of 0.27–0.34 to the range of 0.345–0.365, the crystals did not settle out of the products during vibration. The products were free of monoammonium phosphate crystals, and the diammonium phosphate crystals were about the same thickness as they were originally, indicating that the increase in diammonium phosphate content which resulted from the reaction of ammonia with monoammonium phosphate did not cause excessive growth of diammonium phosphate crystals. The results show conclusively that heretofore unsolvable problems associated with the settling of crystals during vibration can be avoided, and with my invention, high-analysis suspensions with both satisfactory viscosity and satisfactory shipping properties can be prepared from wet-process orthophosphoric acid.

Table I

Phosphate Base Suspensions From Wet-Process Orthophosphoric Acid[a]
by a Two-Stage[b] Ammoniaton Process[c]-
Effect of Adding Ammonia During the Clay Mixing Step
on Vibrational Settling of Crystals
Without NH$_3$ added in clay mixing step

| Test No. | Suspension grade | Initial N:P$_2$O$_5$ ratio | Viscosity,[d] cP | Vibration test settling,[e] vol. % | Effective upper limit[f] in crystal size, micron MAP | DAP |
|---|---|---|---|---|---|---|
| 346-B | 10.4–38.6-0 | 0.269 | 370 | 13.4 | 250 × 250 × 800 | None |
| 346-A | 10.5–38.8-0 | 0.271 | 380 | 13.9 | 150 × 150 × 750 | None |
| 346-C | 10.5—38.7-0 | 0.271 | 380 | 13.0 | 200 × 200 × 850 | None |
| 347-A | 10.7–38.8-0 | 0.276 | 380 | 14.3 | 200 × 200 × 1200 | 30 × 600 × 800 |
| 347-B | 10.9–38.8-0 | 0.281 | 450 | 7.8 | 250 × 250 × 850 | 20 × 400 × 500 |
| 347-C | 11.1–38.8-0 | 0.286 | 500 | 6.0 | 200 × 200 × 750 | 30 × 500 × 550 |
| 343-B | 12.2–38.4-0 | 0.292 | 470 | 5.1 | 150 × 150 × 700 | 20 × 500 × 550 |
| 343-D | 11.6–38.9-0 | 0.298 | 500 | 5.6 | 150 × 150 × 550 | 20 × 550 × 550 |
| 344-C | 11.5–38.5-0 | 0.299 | 480 | 5.1 | 200 × 200 × 800 | 20 × 550 × 550 |
| 342-B | 11.5–38.3-0 | 0.300 | 510 | 4.1 | 200 × 200 × 600 | 20 × 500 × 550 |
| 342-A | 11.8–38.1-0 | 0.310 | 540 | 3.7 | 200 × 200 × 600 | 20 × 500 × 550 |
| 340-D | 11.9–37.3-0 | 0.319 | 500 | 3.7 | 150 × 150 × 500 | 20 × 500× 550 |
| 340-D | 11.9–37.3-0 | 0.319 | 500 | 3.7 | 150 × 150 × 500 | 20 × 500 × 550 |
| 328-A | 12.1–37.7-0 | 0.321 | 560 | 1.9 | 150 × 150 × 400 | 20 × 400 × 400 |
| 349-A | 12.3–37.9-0 | 0.324 | 570 | 3.7 | 100 × 100 × 400 | 30 × 500 × 500 |
| 349-A | 12.3–37.9-0 | 0.324 | 570 | 3.7 | 100 × 100 × 400 | 30 × 500 × 500 |
| 325-A | 12.1–37.2-0 | 0.325 | 560 | 1.9 | 100 × 100 × 450 | 20 × 400 × 400 |
| 339-C | 12.3–37.8-0 | 0.325 | 540 | 3.2 | 100 × 100 × 450 | 20 × 400 × 450 |
| 349-D | 12.4–38.0-0 | 0.326 | 590 | 1.9 | 150 × 150 × 450 | 30 × 500 × 500 |
| 338-C | 12.5–38.3-0 | 0.326 | 640 | 0.9 | 150 × 150 × 500 | 75 × 650 × 700 |
| 341-C | 12.4–37.8-0 | 0.328 | 700 | 3.7 | 150 × 150 × 550 | 20 × 550 + 600 |
| 349-C | 12.5–37.9-0 | 0.330 | 600 | 2.8 | 100 × 100 × 350 | 30 × 500 × 500 |
| 330-B | 12.5–37.7-0 | 0.332 |  | 3.2 | 150 × 150 × 500 | 30 × 550 × 600 |
| 328-D | 12.6–37.8-0 | 0.333 | 620 | 1.9 | 150 × 150 × 600 | 20 × 400 × 400 |
| 328-C | 12.6–37.8-0 | 0.333 | 600 | 4.1 | 150 × 150 × 600 | 20 × 400 × 400 |
| 322-D | 12.9–38.7-0 | 0.333 | 750 | 2.8 | 150 × 150 × 650 | 20 × 450 × 450 |
| 322-C | 12.7–38.0-0 | 0.334 | 640 | 2.8 | 200 × 200 × 600 | 50 × 700 × 700 |
| 324-A | 13.2–39.4-0 | 0.335 | 1210 | 2.3 | 50 × 50 × 300 | 50 × 550 × 600 |
| 322-A | 12.8–38.1-0 | 0.336 | 720 | 4.6 | 150 × 150 × 600 | 20 × 450 × 500 |
| 338-A | 12.9–38.0-0 | 0.339 | 760 | 2.8 | 150 × 150 × 400 | 20 × 500 × 500 |
| 329-D | 13.0–38.2-0 | 0.340 | 640 | 1.9 | 200 × 200 × 600 | 20 × 500 × 500 |

| Test No. | Suspension grade | N:P$_2$O$_5$ ratio | Viscosity,[d] cP | Vibration test settling,[e] vol. % | Effective upper limit[f] in crystal size, micron DAP[g] |
|---|---|---|---|---|---|
| 346-B | 13.1–37.5-0 | 0.349 | 610 | 0 | 30 × 350 × 350 |
| 346-A | 13.1–37.5-0 | 0.349 | 720 | 0 | 30 × 400 × 400 |
| 346-C | 13.1–37.4-0 | 0.350 | 800 | 0 | 20 × 300 × 300 |
|  | 13.5–37.3-0 | 0.362 | 1410 | 0 | 30 × 350 × 350 |
| 347-A | 13.0–37.4-0 | 0.348 | 420 | 0 | 10 × 350 × 350 |
| 347-B | 13.0–37.5-0 | 0.347 | 980 | 0 | 20 × 400 × 400 |
| 347-C | 13.5–37.5-0 | 0.360 | 1020 | 0 | 50 × 700 × 700 |
| 343-B | 13.1–37.9-0 | 0.346 | 700 | 0 | 20 × 500 × 500 |
| 343-D | 13.0–38.0-0 | 0.346 | 630 | 0 | 30 × 600 × 650 |
| 344-C | 13.1–37.8-0 | 0.347 | 620 | 0 | 50 × 700 × 700 |
| 342-B | 13.5–37.4-0 | 0.361 | 960 | 0 | 75 × 850 × 1000 |
| 342-A | 13.2–37.7-0 | 0.350 | 580 | 0 | 20 × 500 × 500 |
| 340-D | 13.0–37.0-0 | 0.351 | 540 | 0 | 50 × 650 × 700 |
|  | 13.1–36.9-0 | 0.355 | 600 | 0 | 50 × 600 × 650 |
| 328-A | 13.3–37.7-0 | 0.353 | 980 | 0 | 20 × 500 × 550 |

Table I-continued

Phosphate Base Suspensions From Wet-Process Orthophosphoric Acid[a]
by a Two-Stage[b] Ammoniaton Process[c]-
Effect of Adding Ammonia During the Clay Mixing Step
on Vibrational Settling of Crystals Without NH$_3$ added in clay mixing step

| Grade | N:P$_2$O$_5$ ratio | Viscosity[d] | Settling[e] | Crystal size[f] |
|---|---|---|---|---|
| 349-A | 12.9–37.4-0 | 0.345 | 640 | 0 | 30 × 500 × 500 |
| | 13.1–37.5-0 | 0.349 | 600 | 0 | 30 × 550 × 600 |
| 325-A | 13.0–37.1-0 | 0.350 | 640 | 0 | 20 × 400 × 450 |
| 339-C | 13.3–37.7-0 | 0.353 | 980 | 0 | 50 × 650 × 700 |
| 349-D | 13.2–37.7-0 | 0.350 | 660 | 0 | 30 × 500 × 500 |
| 338-C | 13.5—37.9-0 | 0.356 | 880 | 0 | 50 × 600 × 600 |
| 341-C | 13.1–37.2-0 | 0.352 | 570 | 0 | 20 × 550 × 600 |
| 349-C | 13.2–37.9-0 | 0.348 | 660 | 0 | 30 × 500 × 500 |
| 330-B | 13.3–37.9-0 | 0.351 | 710 | 0 | |
| 328-D | 13.3–37.9-0 | 0.351 | 700 | 0 | 20 × 500 × 550 |
| 328-C | 13.9–38.0-0 | 0.361 | 1070 | 0 | 20 × 500 × 550 |
| 322-D | 13.9–38.0-0 | 0.364 | 1170 | 0 | 50 × 650 × 900 |
| 322-C | 13.4–38.0-0 | 0.353 | 810 | 0 | 50 × 550 × 600 |
| 324-A | 14.2–39.2-0 | 0.362 | 9000 | 0 | 20 × 400 × 400 |
| 322-A | 13.7–37.7-0 | 0.363 | 1110 | 0 | 20 × 500 × 550 |
| 338-A | 13.7–38.1-0 | 0.360 | 920 | 0 | 50 × 550 × 600 |
| 329-D | 13.5–38.3-0 | 0.352 | 880 | 0 | 50 × 550 × 600 |

[a]Central Florida black wet-process acid contained 53.0% P$_2$O$_5$, 3.9% SO$_4$, 1.2% Al$_2$O$_3$, 1.2% Fe$_2$O$_3$, 0.6% MgO, 0.1% CaO, and 0.8% F.
[b]Retention times in the first stage, second stage, cooler, and clay mixer were 30, 10, 9, and 30 minutes, respectively.
[c]Production rate was 75 lb/hr. Suspensions contained 1.5% clay (Attagel 150).
[d]Measured with a Brookfield viscometer, Model LVT. Suspensions mixed 5 minutes before measurements were made.
[e]Suspensions that settled during 3 hours of vibration
[f]99% of the crystals were this size or smaller.
[g]No MAP crystals were present.

EXAMPLE IV

This example illustrates the importance of N:P$_2$O$_5$ ratio in the second ammoniation stage on settling of crystals during vibration. The suspensions shown in Table II infra were prepared by my new and novel three-stage process as described above. The N:P$_2$O$_5$ ratio of the materials from the second stage was varied from about 0.27 to about 0.35 and the N:P$_2$O$_5$ ratio of the product suspensions was 0.35 or greater. With N:P$_2$O$_5$ ratios in the second stage below about 0.34 and subsequent ammoniation in the clay mixer to 0.35 or above, the product suspensions contained no monoammonium phosphate crystals, the diammonium phosphate crystals were small (thin), and the crystals did not settle during the vibration test which simulated vibration which occurs during transit in railroad tank cars. However, when the N:P$_2$O$_5$ ratio in the second stage exceeded about 0.34, the product suspensions contained large diammonium phosphate crystals, and they settled during the vibration test, indicating that the N:P$_2$O$_5$ ratio in the second stage must not exceed about 0.34 for production of suspensions that do not settle during transit.

Table II

| Slurry from the second stage with clay added | | | | Suspension with clay and ammonia added in the clay mixer | | | |
|---|---|---|---|---|---|---|---|
| Suspension grade | N:P$_2$O$_5$ ratio | Vibrational settling, vol. % | Upper limit in DAP crystal size, micron | Suspension grade | N:P$_2$O$_5$ ratio | Vibrational settling, vol.% | Upper limit in DAP crystal size, micron |
| 10.4–38.6-0 | 0.269 | 13.4 | None | 13.1–37.5-0 | 0.349 | 0 | 30 × 350 × 350 |
| 10.5–38.8-0 | 0.271 | 13.9 | None | 13.1–37.5-0 | 0.349 | 0 | 30 × 400 × 400 |
| 10.9–38.8-0 | 0.286 | 6.0 | None | 13.5–37.5-0 | 0.360 | 0 | 30 × 500 × 500 |
| 12.0–38.9-0 | 0.308 | 8.8 | 30 × 250 × 500 | 13.5–38.1-0 | 0.354 | 0 | 30 × 400 × 500 |
| 11.9–37.3-0 | 0.319 | 3.7 | 20 × 400 × 400 | 13.1–36.9-0 | 0.355 | 0 | 20 × 500 × 550 |
| 12.4–37.8-0 | 0.328 | 3.7 | 20 × 550 × 600 | 13.1–37.2-0 | 0.352 | 0 | 20 × 550 × 600 |
| 12.9–38.0-0 | 0.339 | 2.8 | 50 × 500 × 500 | 13.5–38.3-0 | 0.352 | 0 | 50 × 550 × 600 |
| 13.4–39.2-0 | 0.342 | 1.4 | 50 × 500 × 600 | 13.9–39.3-0 | 0.354 | 5.1 | 50 × 500 × 600 |
| 13.3–38.4-0 | 0.346 | 2.8 | 50 × 500 × 550 | 13.5–38.2-0 | 0.353 | 2.3 | 100 × 800 × 800 |
| 13.3–38.4-0 | 0.346 | 2.8 | 50 × 500 × 550 | 13.7–38.1-0 | 0.360 | 1.9 | 50 × 500 × 600 |

EXAMPLE V

This example illustrates the importance of N:P$_2$O$_5$ ratio in product suspensions prepared by my novel process on settling of crystals during vibration such as occurs during shipment. The products were prepared by my process as fully described above. To show the effect of N:P$_2$O$_5$ ratio in the product suspensions, slurry from the cooler with N:P$_2$O$_5$ ratio in the range of 0.30 to 0.33 was divided into several parts. To the first part, only attapulgite clay (1.5 percent) was added and the N:P$_2$O$_5$ ratio of the product suspension was in the range of 0.30 to 0.33. To the other parts, clay and ammonia were simultaneously added in the clay mixer. The amounts of ammonia that were added was varied to give products with N:P$_2$O$_5$ ratios covering the range of about 0.33 to 0.36. The products were then subjected to vibration to determine the proportion (volume percent) of crystals that would settle. The results are shown in Table III below.

Table III

| Without ammonia added in clay mixer | | | With ammonia added in clay mixer | | |
|---|---|---|---|---|---|
| Suspension grade | N:P$_2$O$_5$ ratio | Vibrational settling, vol. % | Suspension grade | N:P$_2$O$_5$ ratio | Vibrational settling, vol. % |
| 11.5–38.3-0 | 0.300 | 4.1 | 12.8–37.7-0 | 0.34 | 6.9 |
| | | | 13.5–37.4-0 | 0.361 | 0 |

Table III-continued

| Without ammonia added in clay mixer | | | With ammonia added in clay mixer | | |
|---|---|---|---|---|---|
| Suspension grade | N:P$_2$O$_5$ ratio | Vibrational settling, vol. % | Suspension grade | N:P$_2$O$_5$ ratio | Vibrational settling, vol. % |
| 12.0–37.6–0 | 0.32 | 3.7 | 12.4–37.8–0 | 0.328 | 8.8 |
| | | | 12.7–37.8–0 | 0.336 | 6.5 |
| | | | 13.0–37.6–0 | 0.346 | 3.7 |
| 12.7–38.5–0 | 0.33 | 7.4 | 12.9–38.4–0 | 0.336 | 7.4 |
| | | | 13.2–38.2–0 | 0.346 | 4.2 |
| | | | 13.6–38.2–0 | 0.356 | 0 |
| 12.5–37.4–0 | 0.33 | 3.3 | 12.7–37.3–0 | 0.340 | 4.6 |
| | | | 12.8–37.2–0 | 0.344 | 1.9 |
| | | | 13.0–37.3–0 | 0.349 | 1.9 |
| | | | 13.4–37.1–0 | 0.361 | 0 |

The results indicate that an N:P$_2$O$_5$ ratio of about 0.35 or greater is required in the product suspensions for preventing of settling during vibration such as occurs during shipment.

After sifting and winnowing through the data, results, and operations of my new, novel, improved, and unique processes for producing ammonium phosphate (N:P$_2$O$_5$) and mixed (N:P$_2$O$_5$:K$_2$O) suspension fertilizers from wet-process orthophosphoric acids by my three-stage process, the range of operating conditions as well as the preferred range of conditions and variables for carrying out my process are summarized in Table IV below. While I have described my process and set forth the operating variables therefor in terms of a continuous three-stage process, it should be appreciated that, as in the teachings of Kendrick, supra, those producers who have the type of equipment already installed in their plants which lends itself to a step-wise batch simultaneous method of operation rather than a continuous processing may practice my teachings by incorporating the operating variables, infra, from my first second and third stages into first, second, and third steps, respectively.

Table IV

| | Operating range | Preferred range or value |
|---|---|---|
| First stage | | |
| N:P$_2$O$_5$ ratio | 0.20 – 0.25 | 0.23 |
| Temperature, ° F | 220° F – Boiling | Boiling (~220°) |
| Retention time, min | 15 – 75 | 15 – 30 |
| Second stage | | |
| N:P$_2$O$_5$ ratio | 0.27 – 0.34 | 0.32 |
| Temperature, ° F | 180 – 220 | 200 |
| Retention time, min | 10 – 90 | 15 – 20 |
| Cooler | | |
| Temperature, ° F | 70 – 120 | 90 –100 |
| Third stage (clay mixer) | | |
| N:P$_2$O$_5$ ratio | 0.34 – 0.37 | 0.35 – 0.36 |
| Temperature, ° F | 90 – 120 | 100 |
| Retention time, min | 15 – 60 | 30 |

While I have shown and described particular embodiments of my invention, modifications and variations thereof will occur to those skilled in the art. I wish it to be understood therefore that the appended claims are intended to cover such modifications and variations which are within the true scope and spirit of my invention.

What I claim as new and desire to secure by letters patent of the United States is:

1. A process for the production of stable suspension-type fertilizers from wet-process orthophosphoric acid, which suspensions have unusually high plant food contents of upwards to about 14 percent nitrogen by weight and upwards to about 41 percent phosphorus by weight, said phosphorus expressed as P$_2$O$_5$ and said P$_2$O$_5$ being present therein as substantially 100 percent orthophosphate and containing the congeneric impurities originally present in said wet-process acid, excellent flow properties within the pourability expressed as percent of total volume is substantially 100 percent, and unusually low viscosities in the range of approximately 500–1000 cP at 80° F, said pourability and said viscosities effective both (a) after storage for up to about 90 days at about 100° F, and (b) after exposure to substantial vibration equivalent to that experienced in railroad tank cars and the like traveling distances in excess of 50 miles, which process comprises the steps of:

1. simultaneously adding a stream of ammonia, a stream of water, and a stream of merchant-grade orthophosphoric acid of the wet-process type to a first reactor; controlling the portion of ammonia added relative to said merchant-grade wet-process phosphoric acid in said first reactor to continuously produce an N:P$_2$O$_5$ mole ratio therein in the range from about 0.20 to about 0.25;

removing at least a portion of the resulting partially ammoniated mechant-grade wet-process phosphoric acid material from said first reactor and introducing said removed material as a stream into a second reactor; simultaneously introducing into said second reactor together with said stream of material from said first reactor a stream of ammonia; controlling the portion of ammonia added to said second reactor to produce an N:P$_2$O$_5$ mole ratio in the range from about 0.27 to about 0.34;

3. removing at least a portion of the resulting further partially ammoniated merchant-grade wet-process phosphoric acid material from said second reactor and introducing said removed material as a stream into a third reactor; simultaneously introducing into said third reactor, together with said stream of material from said second reactor, a stream of ammonia together with small amounts of gelling type clay; controlling the portion of ammonia added to said third reactor to reduce the N:P$_2$O$_5$ ratio therein in the range from about 0.34 to about 0.37; and 4. removing from said third reactor the resulting stable suspension characterized by the plant-food content, flow properties, and viscosities set forth supra, and further characterized by the fact that substantially 100 percent of the phosphate values therein are of the ortho type and are derived from wet-process acid.

2. A process for the production of stable suspension-type fertilizers from wet-process orthophosphoric acid, which suspensions have unusually high plant food contents of upwards to about 14 percent nitrogen by weight and upwards to about 41 percent phosphorus by weight, said phosphorus expressed as P$_2$O$_5$ and said P$_2$O$_5$ being present therein as substantially 100 percent orthophosphate and containing the congeneric impurities originally present in said wet-process acid, excellent flow properties within the pourability expressed as percent of total volume is substantially 100 percent, and unusually low viscosities in the range of approximately 500–1000 cP at 80° F, said pourability and said viscosities effective both (a) after storage for up to about 90 days at about 100° F, and (b) after exposure to substantial vibration equivalent to that experienced in railroad tank cars and the like traveling distances in excess of 50 miles, which process comprises the steps of:

1. simultaneously adding a stream of ammonia, a stream of water, and a stream of merchant-grade orthophosphoric acid of the wet-process type to a first reactor; controlling the portion of ammonia added relative to said merchant-grade wet-process phosphoric acid in said first reactor to continuously produce an $N:P_2O_5$ mole ratio therein of about 0.23;
2. removing at least a portion of the resulting partially ammoniated merchant-grade wet-process phosphoric acid material from said first reactor and introducing said removed material as a stream into a second reactor; simultaneously introducing into said second reactor together with said stream of material from said first reactor a stream of ammonia; controlling the portion of ammonia added to said second reactor to produce an $N:P_2O_5$ mole ratio of about 0.32;
3. removing at least a portion of the resulting further partially ammoniated merchant-grade wet-process phosphoric acid material from said second reactor and introducing said removed material as a stream into a third reactor; simultaneously introducing into said third reactor, together with said stream of material from said second reactor, a stream of ammonia together with small amounts of gelling type clay; controlling the portion of ammonia added to said third reactor to reduce the $N:P_2O_5$ ratio therein in the range from about 0.35 to about 0.36; and
4. removing from said third reactor the resulting stable suspension characterized by the plant-food content, flow properties, and viscosities set forth supra, and further characterized by the fact that substantially 100 percent of the phosphate values therein are of the ortho type and are derived from wet-process acid.

3. The process of claim 1 wherein the retention time in the first reactor is in the range from about 15 to about 75 minutes, wherein the retention time in the second reactor is in the range from about 10 to about 90 minutes, and wherein the retention time in the third reactor is from about 15 to about 60 minutes.

4. The process of claim 3 wherein the retention time in the first reactor is in the range from about 15 to about 30 minutes, wherein the retention time in the second reactor is in the range from about 15 to about 20 minutes, and wherein the retention time in the third reactor is about 30 minutes.

5. The process of claim 3 wherein the temperature maintained in the first reactor is in the range from about 220° F to about 225° F, wherein the temperature in the second reactor is in the range from about 180° F to about 220° F, and wherein the temperature in the third reactor is in the range from about 90° F to about 120° F.

6. The process of claim 5 wherein the temperature maintained in the first reactor is about 220° F, wherein the temperature in the second reactor is maintained at about 200° F, and wherein the temperature in the third reactor is maintained at about 100° F.

* * * * *

UNITED STATES PATENT AND TRADEMARK OFFICE
CERTIFICATE OF CORRECTION

PATENT NO. : 4,066,432
DATED : January 3, 1978
INVENTOR(S) : Thomas M. Jones

It is certified that error appears in the above–identified patent and that said Letters Patent are hereby corrected as shown below:

Column 3, lines 36 and 37, change "transportion" to -- transportation --

Column 8, line 52, before "eliminating" change "of" to -- or --

Table I, column 10, under heading "DAP" and opposite "Test 341-C"

change "20 x 550 + 600" to -- 20 x 550 x 600 --

Column 14, lines 33 and 43, after "$N:P_2O_5$" delete "mole" and substitute -- weight --

Column 15, line 28, after "$N:P_2O_5$" delete "mole" and substitute -- weight --

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*